(12) United States Patent
Muratori et al.

(10) Patent No.: US 7,222,264 B2
(45) Date of Patent: May 22, 2007

(54) DEBUG SYSTEM AND METHOD HAVING SIMULTANEOUS BREAKPOINT SETTING

(75) Inventors: Richard D. Muratori, Stow, MA (US); Eric Walker, Lancaster, MA (US); Dennis Rivard, Atkinson, NH (US)

(73) Assignee: Intel Corporation, Santa Clara, CA (US)

( * ) Notice: Subject to any disclaimer, the term of this patent is extended or adjusted under 35 U.S.C. 154(b) by 473 days.

(21) Appl. No.: 10/804,843

(22) Filed: Mar. 19, 2004

(65) Prior Publication Data

US 2005/0210335 A1    Sep. 22, 2005

(51) Int. Cl.
*G06F 11/00*    (2006.01)

(52) U.S. Cl. .................. 714/35; 717/124; 717/129; 714/33; 714/34; 714/38

(58) Field of Classification Search ............... 714/35, 714/38, 33, 34
See application file for complete search history.

(56) References Cited

U.S. PATENT DOCUMENTS

| | | | | |
|---|---|---|---|---|
| 5,611,043 A | | 3/1997 | Even et al. ................ 714/38 |
| 6,042,614 A | * | 3/2000 | Davidson et al. .......... 717/116 |
| 6,275,980 B1 | | 8/2001 | Uchihira et al. ........... 717/124 |
| 6,418,543 B1 | | 7/2002 | Goli et al. ................ 714/38 |
| 6,516,460 B1 | | 2/2003 | Merks et al. ............... 717/124 |
| 6,598,222 B2 | | 7/2003 | Uchihira et al. ........... 717/154 |
| 6,678,884 B1 | | 1/2004 | Kesselman et al. ......... 717/129 |
| 6,681,384 B1 | * | 1/2004 | Bates et al. ............... 717/129 |
| 6,859,892 B2 | * | 2/2005 | Bolding et al. ............. 714/34 |
| 2002/0073402 A1 | * | 6/2002 | Sangavarapu et al. ...... 717/129 |
| 2002/0087950 A1 | * | 7/2002 | Brodeur et al. ............ 717/124 |
| 2002/0100019 A1 | * | 7/2002 | Hunter et al. .............. 717/124 |
| 2002/0100024 A1 | * | 7/2002 | Hunter et al. .............. 717/129 |
| 2002/0124241 A1 | | 9/2002 | Grey et al. ................ 717/149 |
| 2003/0005415 A1 | * | 1/2003 | Bates et al. ............... 717/129 |
| 2003/0014736 A1 | * | 1/2003 | Nguyen et al. ............. 717/129 |
| 2003/0040898 A1 | | 2/2003 | McWilliams et al. ........ 703/21 |
| 2003/0149961 A1 | * | 8/2003 | Kawai et al. .............. 717/129 |
| 2003/0154463 A1 | * | 8/2003 | Betker et al. .............. 717/129 |
| 2003/0167459 A1 | | 9/2003 | Bates et al. ............... 717/125 |
| 2003/0177476 A1 | | 9/2003 | Sarma et al. .............. 717/128 |
| 2003/0217354 A1 | * | 11/2003 | Bates et al. ............... 717/129 |
| 2003/0233634 A1 | * | 12/2003 | Carrez et al. .............. 717/124 |
| 2004/0030745 A1 | | 2/2004 | Boucher et al. ............ 709/203 |
| 2004/0030870 A1 | * | 2/2004 | Buser ....................... 712/227 |
| 2004/0040013 A1 | | 2/2004 | Kalra ....................... 717/129 |
| 2004/0205719 A1 | * | 10/2004 | Hooper et al. ............. 717/124 |
| 2004/0205747 A1 | * | 10/2004 | Bernstein et al. .......... 717/174 |
| 2006/0150007 A1 | * | 7/2006 | Gostynski et al. ........... 714/12 |

* cited by examiner

*Primary Examiner*—Scott Baderman
*Assistant Examiner*—Loan Truong (57) ABSTRACT

A processor code debugger method and system enables the setting at one time of breakpoints corresponding to a given line of source code associated with an instruction in multiple processing engines.

19 Claims, 11 Drawing Sheets

DEBUG SYSTEM AND METHOD HAVING SIMULTANEOUS BREAKPOINT SETTING

CROSS REFERENCE TO RELATED APPLICATIONS

Not Applicable.

STATEMENT REGARDING FEDERALLY SPONSORED RESEARCH

Not Applicable.

FIELD OF THE INVENTION

The present invention relates generally to programming devices and, more particularly, to debugging program code.

BACKGROUND OF THE INVENTION

As is known in the art, many processor chip vendors provide hardware simulators so that software developers can begin debugging the software prior to running the software on the processor hardware. The simulator enables a user to obtain detailed information during the execution of the software.

Known software debugger systems typically enable a user to set a breakpoint to stop program execution at a defined event. Various data and state information can be displayed to enable a user to debug the program. Conventional debuggers support the setting of a breakpoint on a single processor.

Some known simulators operate to simulate a system having multiple processing engines. An application may include multiple processing engines running similar, if not identical, images, which share common source code. During debugging, it is sometimes necessary to set a breakpoint on the same line of common code in all or some of the processing engines that share that code. In know systems the breakpoint is set in each processing engine individually. This requires manually identifying the processing engines that contain images built using the source file of interest and then locating the assembled or compiled location of the desired source line in each of those processing engines. This process can be quite tedious and error-prone.

DETAILED DESCRIPTION

Figure 1:
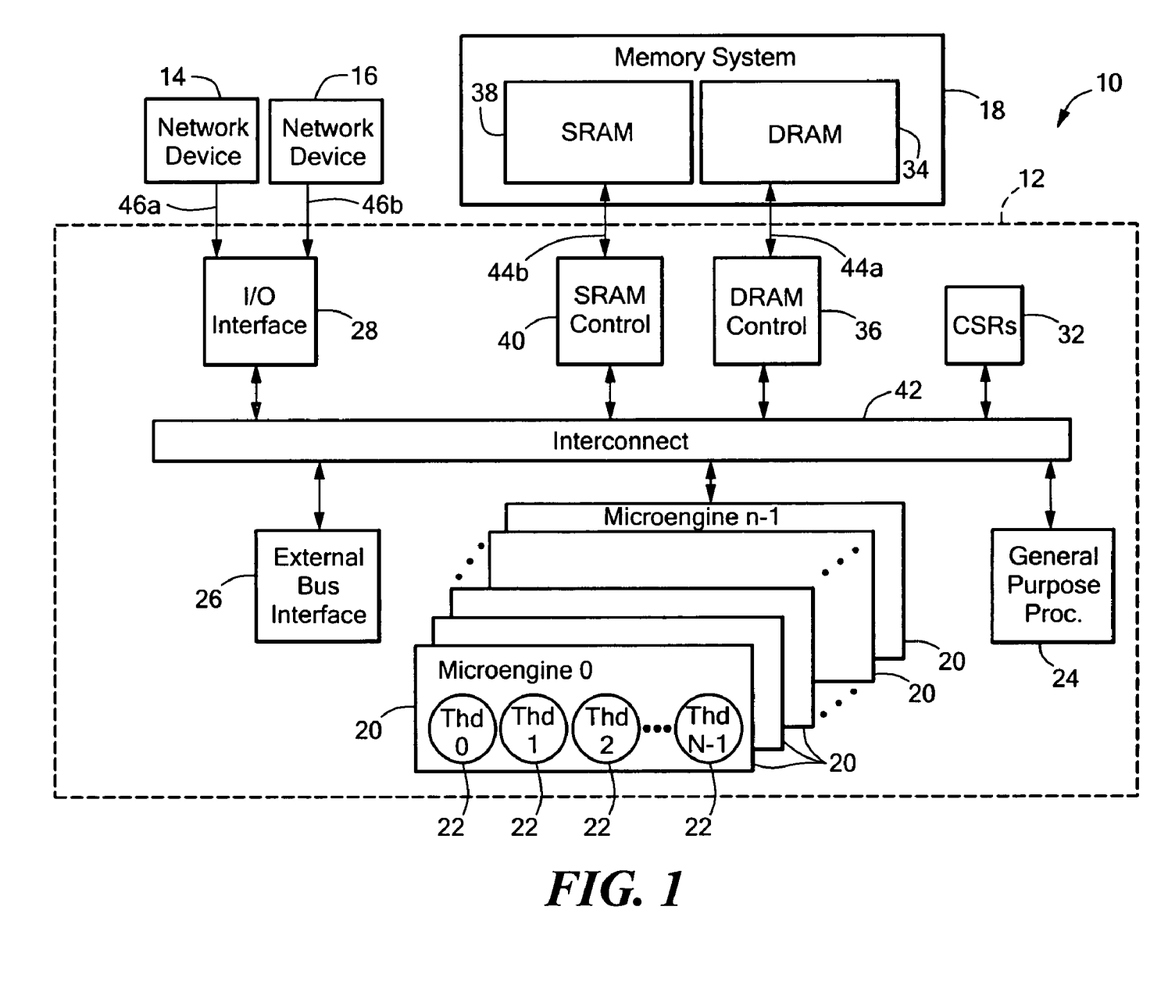
FIG. 1 is a block diagram of a processor having microengines that support multiple threads of execution.

Referring to FIG. 1, a system 10 includes a processor 12 coupled to one or more I/O devices, for example, network devices 14 and 16, as well as a memory system 18. The processor 12 includes multiple processors ("microengines" or "MEs") 20, each with multiple hardware controlled execution threads 22. In the example shown, there are "n" microengines 20, and each of the microengines 20 is capable of processing multiple threads 22, as will be described more fully below. In the described embodiment, the maximum number "N" of threads supported by the hardware is eight. Each of the microengines 20 is connected to and can communicate with adjacent microengines.

In one embodiment, the processor 12 also includes a processor 24 that assists in loading microcode control for the microengines 20 and other resources of the processor 12, and performs other general-purpose computer type functions such as handling protocols and exceptions. In network processing applications, the processor 24 can also provide support for higher layer network processing tasks that cannot be handled by the microengines 20.

The microengines 20 each operate with shared resources including, for example, the memory system 18, an external bus interface 26, an I/O interface 28 and Control and Status Registers (CSRs) 32. The I/O interface 28 is responsible for controlling and interfacing the processor 12 to the I/O devices 14, 16. The memory system 18 includes a Dynamic Random Access Memory (DRAM) 34, which is accessed using a DRAM controller 36 and a Static Random Access Memory (SRAM) 38, which is accessed using an SRAM controller 40. Although not shown, the processor 12 also would include a nonvolatile memory to support boot operations. The DRAM 34 and DRAM controller 36 are typically used for processing large volumes of data, e.g., in network applications, processing of payloads from network packets. In a networking implementation, the SRAM 38 and SRAM controller 40 are used for low latency, fast access tasks, e.g., accessing look-up tables, storing buffer descriptors and free buffer lists, and so forth.

The devices 14, 16 can be any network devices capable of transmitting and/or receiving network traffic data, such as framing/MAC devices, e.g., for connecting to 10/100BaseT Ethernet, Gigabit Ethernet, ATM or other types of networks, or devices for connecting to a switch fabric. For example, in one arrangement, the network device 14 could be an Ethernet MAC device (connected to an Ethernet network, not shown) that transmits data to the processor 12 and device 16 could be a switch fabric device that receives processed data from processor 12 for transmission onto a switch fabric.

In addition, each network device 14, 16 can include a plurality of ports to be serviced by the processor 12. The I/O interface 28 therefore supports one or more types of interfaces, such as an interface for packet and cell transfer between a PHY device and a higher protocol layer (e.g., link layer), or an interface between a traffic manager and a switch fabric for Asynchronous Transfer Mode (ATM), Internet Protocol (IP), Ethernet, and similar data communications applications. The I/O interface 28 may include separate receive and transmit blocks, and each may be separately configurable for a particular interface supported by the processor 12.

Other devices, such as a host computer and/or bus peripherals (not shown), which may be coupled to an external bus controlled by the external bus interface 26 can also serviced by the processor 12.

In general, as a network processor, the processor 12 can interface to any type of communication device or interface that receives/sends data. The processor 12 functioning as a network processor could receive units of information from a network device like network device 14 and process those units in a parallel manner. The unit of information could include an entire network packet (e.g., Ethernet packet) or a portion of such a packet, e.g., a cell such as a Common Switch Interface (or "CSIX") cell or ATM cell, or packet segment. Other units are contemplated as well.

Each of the functional units of the processor 12 is coupled to an internal bus structure or interconnect 42. Memory busses 44a, 44b couple the memory controllers 36 and 40, respectively, to respective memory units DRAM 34 and SRAM 38 of the memory system 18. The I/O Interface 28 is coupled to the devices 14 and 16 via separate I/O bus lines 46a and 46b, respectively.

Figure 2:
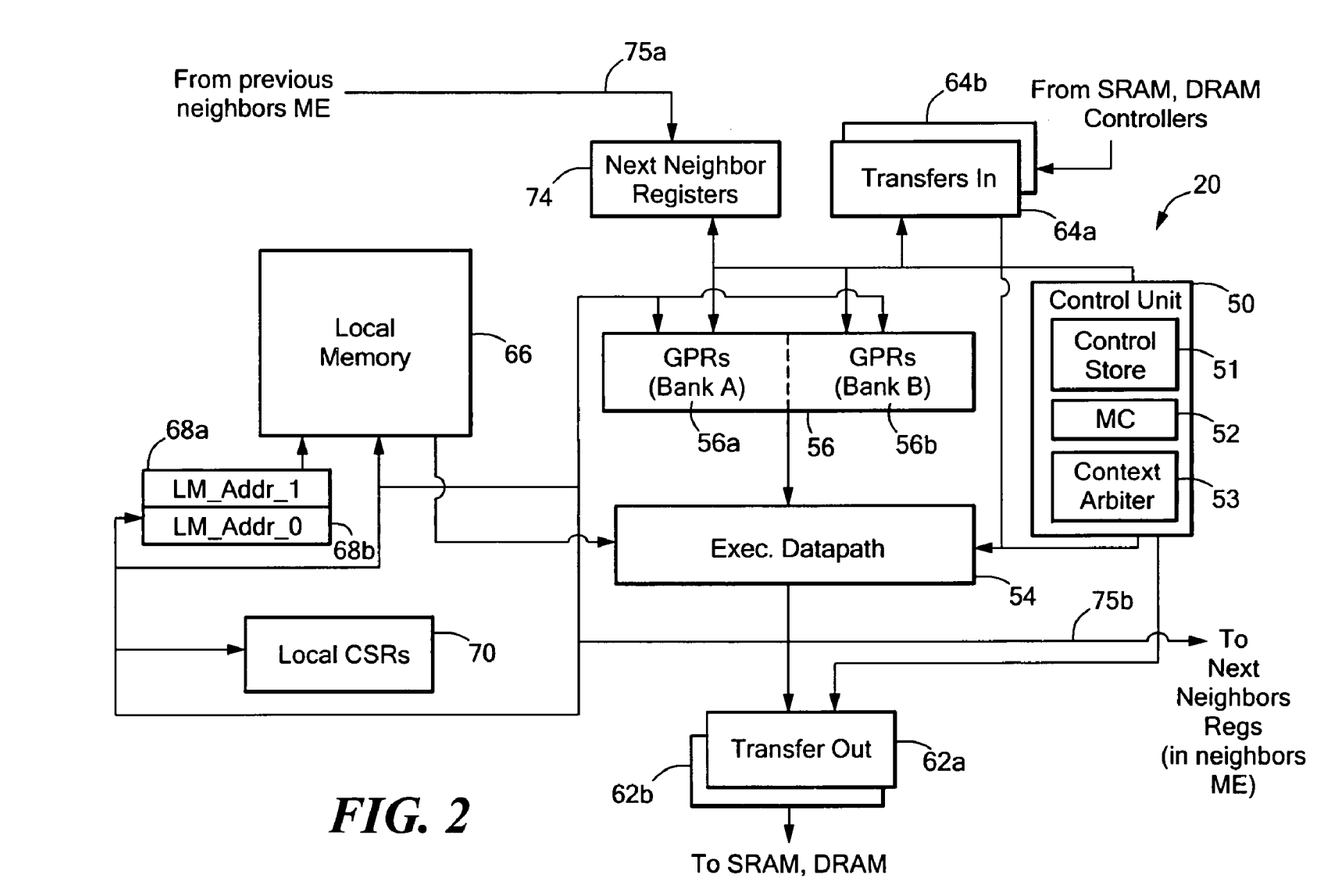
FIG. 2 is a block diagram of an exemplary microengine (ME) that runs microcode.

Referring to FIG. 2, an exemplary one of the microengines 20 is shown. The microengine (ME) 20 includes a control unit 50 that includes a control store 51, control logic (or microcontroller) 52 and a context arbiter/event logic 53. The control store 51 is used to store microcode. The microcode is loadable by the processor 24. The functionality of the ME threads 22 is therefore determined by the microcode loaded via the core processor 24 for a particular user's application into the microengine's control store 51.

The microcontroller 52 includes an instruction decoder and program counter (PC) units for each of the supported threads. The context arbiter/event logic 53 can receive messages from any of the shared resources, e.g., SRAM 38, DRAM 34, or processor core 24, and so forth. These messages provide information on whether a requested function has been completed.

The ME 20 also includes an execution datapath 54 and a general purpose register (GPR) file unit 56 that is coupled to the control unit 50. The datapath 54 may include a number of different datapath elements, e.g., an ALU, a multiplier and a Content Addressable Memory (CAM).

The registers of the GPR file unit 56 (GPRs) are provided in two separate banks, bank A 56a and bank B 56b. The GPRs are read and written exclusively under program control. The GPRs, when used as a source in an instruction, supply operands to the datapath 54. When used as a destination in an instruction, they are written with the result of the datapath 54. The instruction specifies the register number of the specific GPRs that are selected for a source or destination. Opcode bits in the instruction provided by the control unit 50 select which datapath element is to perform the operation defined by the instruction.

The ME 20 further includes write transfer (transfer out) register file 62 and a read transfer (transfer in) register file 64. The write transfer registers of the write transfer register file 62 store data to be written to a resource external to the microengine. In the illustrated embodiment, the write transfer register file is partitioned into separate register files for SRAM (SRAM write transfer registers 62a) and DRAM (DRAM write transfer registers 62b). The read transfer register file 64 is used for storing return data from a resource external to the microengine 20. Like the write transfer register file, the read transfer register file is divided into separate register files for SRAM and DRAM, register files 64a and 64b, respectively. The transfer register files 62, 64 are connected to the datapath 54, as well as the control store 50. It should be noted that the architecture of the processor 12 supports "reflector" instructions that allow any ME to access the transfer registers of any other ME.

Also included in the ME 20 is a local memory 66. The local memory 66 is addressed by registers 68a ("LM_Addr_1"), 68b ("LM_Addr_0"), which supplies operands to the datapath 54, and receives results from the datapath 54 as a destination.

The ME 20 also includes local control and status registers (CSRs) 70, coupled to the transfer registers, for storing local inter-thread and global event signaling information, as well as other control and status information. Other storage and functions units, for example, a Cyclic Redundancy Check (CRC) unit (not shown), may be included in the microengine as well.

Other register types of the ME 20 include next neighbor (NN) registers 74, coupled to the control store 50 and the execution datapath 54, for storing information received from a previous neighbor ME ("upstream ME") in pipeline processing over a next neighbor input signal 76a, or from the same ME, as controlled by information in the local CSRs 70. A next neighbor output signal 76b to a next neighbor ME ("downstream ME") in a processing pipeline can be provided under the control of the local CSRs 70. Thus, a thread on any ME can signal a thread on the next ME via the next neighbor signaling.

Figure 3:
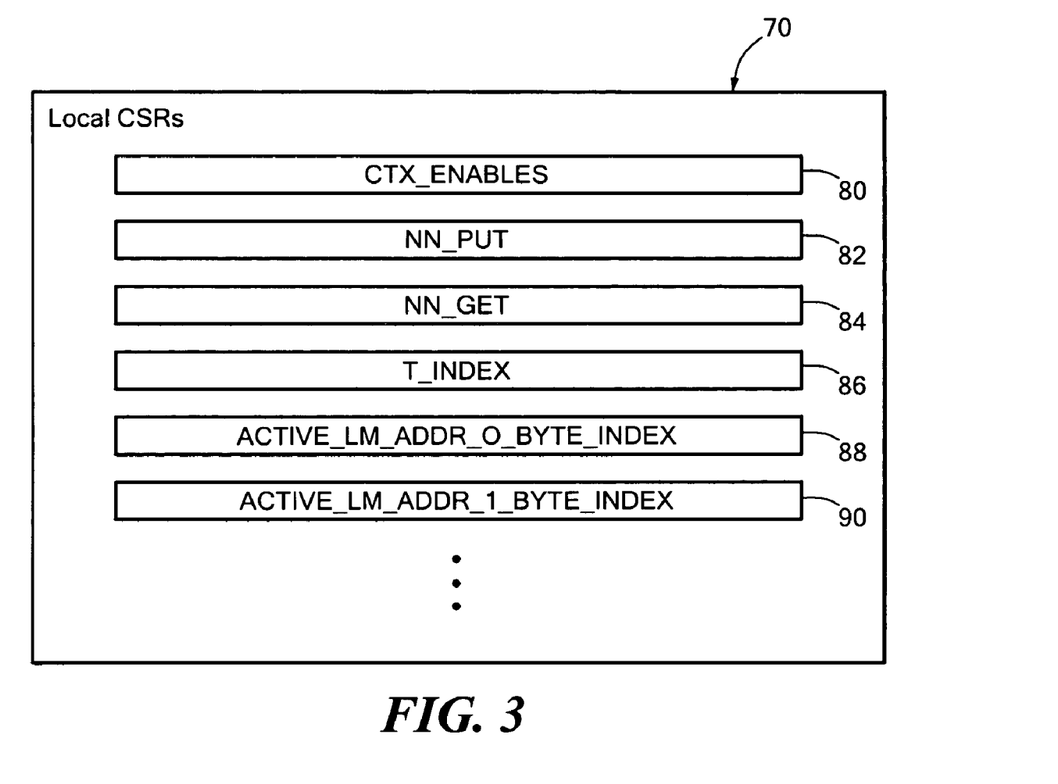
FIG. 3 is a depiction of some local Control and Status Registers (CSRs) of the ME (from FIG. 2)

Generally, the local CSRs 70 are used to maintain context state information and inter-thread signaling information. Referring to FIG. 3, registers in the local CSRs 70 may include the following: CTX_ENABLES 80; NN_PUT 82; NN_GET 84; T_INDEX 86; ACTIVE_LM_ADDR_0_BYTE_INDEX 88; and ACTIVE_LM_ADDR_1_BYTE_INDEX 90. The CTX_ENABLES register 80 specifies, among other information, the number of contexts in use (which determines GPR and transfer register allocation) and which contexts are enabled. It also controls how NN mode, that is, how the NN registers in the ME are written (NN_MODE='0' meaning that the NN registers are written by a previous neighbor ME, NN_MODE='1' meaning the NN registers are written from the current ME to itself). The NN_PUT register 82 contains the "put" pointer used to specify the register number of the NN register that is written using indexing. The NN_GET register 84 contains the "get" pointer used to specify the register number of the NN register that is read when using indexing. The T_INDEX register 86 provides a pointer to the register number of the transfer register (that is, the S_TRANSFER register 62a or D_TRANSFER register 62b) that is accessed via indexed mode, which is specified in the source and destination fields of the instruction. The ACTIVE_LM_ADDR_0_BYTE_INDEX 88 and ACTIVE_LM_ADDR_1_BYTE_INDEX 90 provide pointers to the number of the location in local memory that is read or written. Reading and writing the ACTIVE_LM_ADDR_x_BYTE_INDEX register reads and writes both the corresponding LM_ADDR_x register and BYTE_INDEX registers (also in the local CSRs).

In the illustrated embodiment, the GPR, transfer and NN registers are provided in banks of 128 registers. The hardware allocates an equal portion of the total register set to each ME thread. The 256 GPRs per-ME can be accessed in thread-local (relative) or absolute mode. In relative mode, each thread accesses a unique set of GPRs (e.g., a set of 16 registers in each bank if the ME is configured for 8 threads). In absolute mode, a GPR is accessible by any thread on the ME. The mode that is used is determined at compile (or assembly) time by the programmer. The transfer registers, like the GPRs, can be assessed in relative mode or in absolute-mode. If accessed globally in absolute mode, they are accessed indirectly through an index register, the T_INDEX register. The T_INDEX is loaded with the transfer register number to access.

As discussed earlier, the NN registers can be used in one or two modes, the "neighbor" and "self" modes (configured using the NN_MODE bit in the CTX_ENABLES CSR). The "neighbor" mode makes data written to the NN registers available in the NN registers of a next (adjacent) downstream ME. In the "self" mode, the NN registers are used as extra GPRs. That is, data written into the NN registers is read back by the same ME. The NN_GET and NN_PUT registers allow the code to treat the NN registers as a queue when they are configured in the "neighbor" mode. The NN_GET and NN_PUT CSRs can be used as the consumer and producer indexes or pointers into the array of NN registers.

At any give time, each of the threads (or contexts) of a given ME is in one of four states: inactive; executing; ready and sleep. At most one thread can be in the executing state at a time. A thread on a multi-threaded processor such as ME 20 can issue an instruction and then swap out, allowing another thread within the same ME to run. While one thread is waiting for data, or some operation to complete, another thread is allowed to run and complete useful work. When the instruction is complete, the thread that issued it is signaled, which causes that thread to be put in the ready state when it receives the signal. Context switching occurs only when an executing thread explicitly gives up control. The thread that has transitioned to the sleep state after executing and is waiting for a signal is, for all practical purposes, temporarily disabled (for arbitration) until the signal is received.

Figure 4:
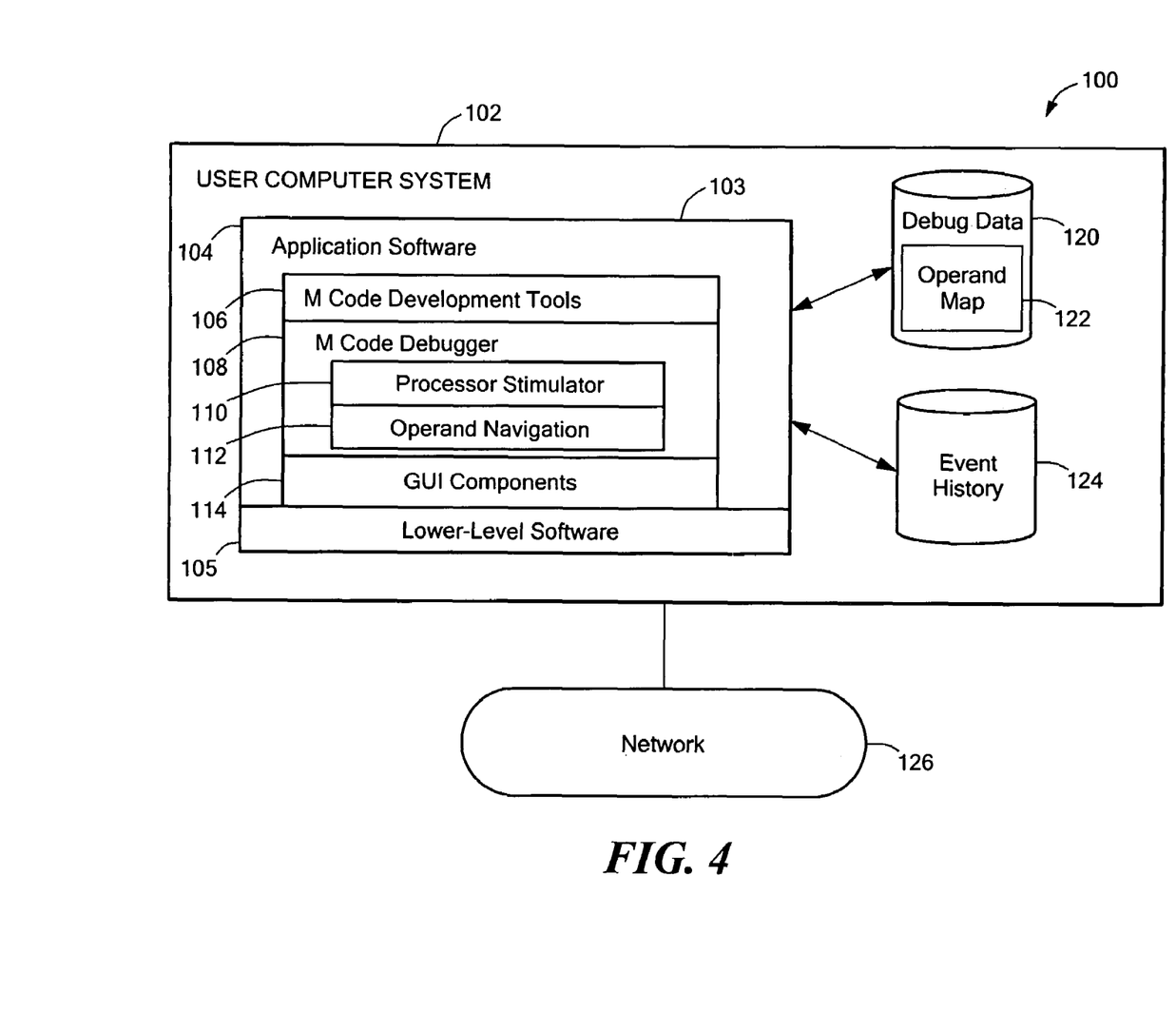
FIG. 4 is a schematic depiction of an exemplary development/debugging system that can be used to debug microcode for the ME shown in FIG. 2.
Figure 4A:
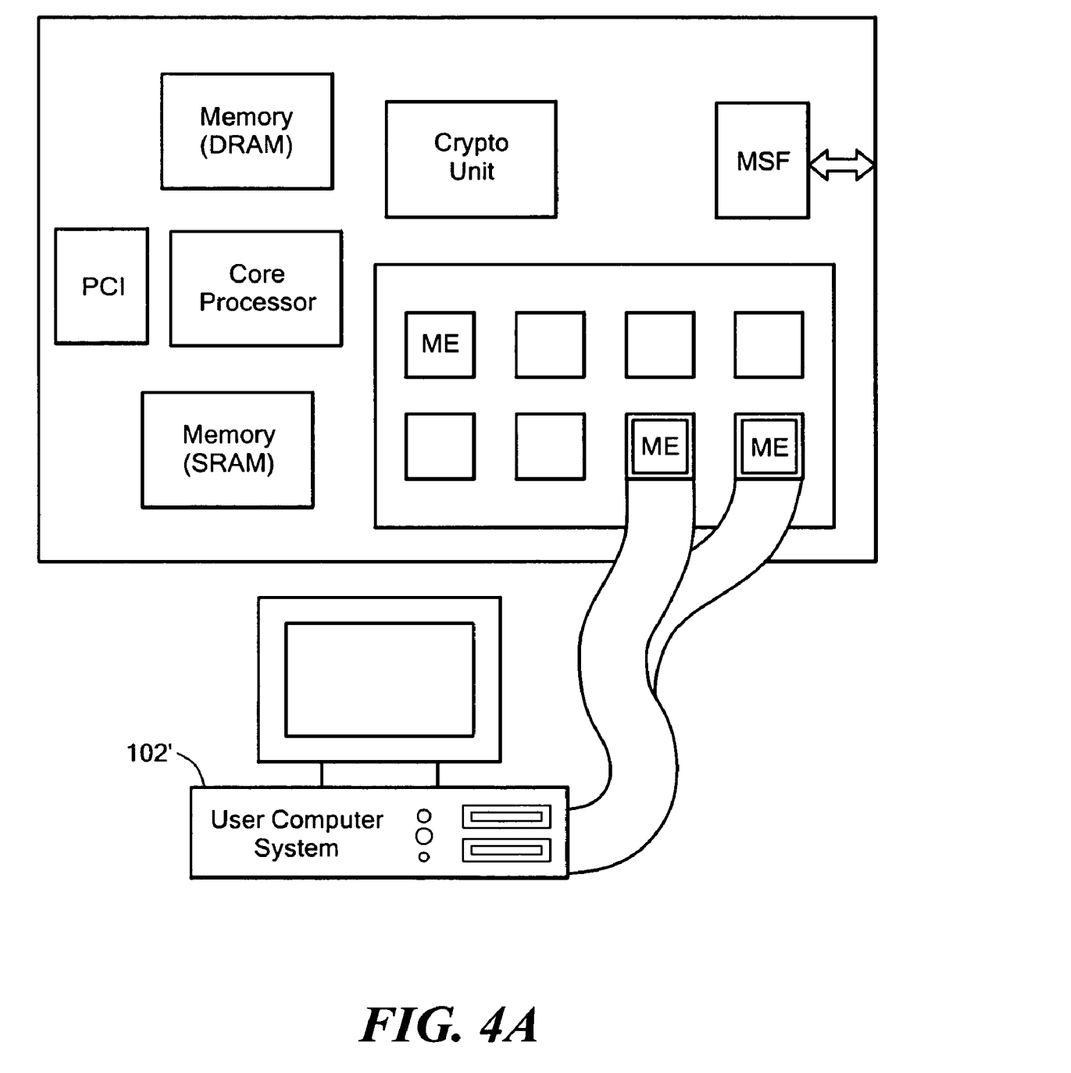

FIG. 4 shows an integrated development/debugger system environment 100 that includes a user computer system 102. The computer system 102 is configured to debug microcode that is intended to execute on a processing element. In one embodiment, to be described, the processing element is the ME 20, which may operate in conjunction with other MEs 20, as shown in FIGS. 1–2. Software 103 includes both upper-level application software 104 and lower-level software (such as an operating system or "OS") 105. The application software 104 includes microcode development tools 106 (for example, in the example of processor 12, a compiler and/or assembler, and a linker, which takes the compiler or assembler output on a per-ME basis and generates an image file for all specified MEs). The application software 104 further includes a source level microcode debugger 108, which include a processor simulator 110 (to simulate the hardware features of processor 12) and an Operand Navigation mechanism 112. Also include in the application software 104 are GUI components 114, some of which support the Operand Navigation mechanism 112. The Operand Navigation 112 can be used to trace instructions, and more particularly, instruction operands, during debug, as will be described.

Still referring to FIG. 4, the system 102 also includes several databases. The databases include debug data 120, which is "static" (as it is produced by the compiler/linker or assembler/linker at build time) and includes an Operand Map 122, and an event history 124. The event history stores historical information (such as register values at different cycle times) that is generated over time during simulation. The system 102 may be operated in standalone mode or may be coupled to a network 126 (as shown).

Figure 5:
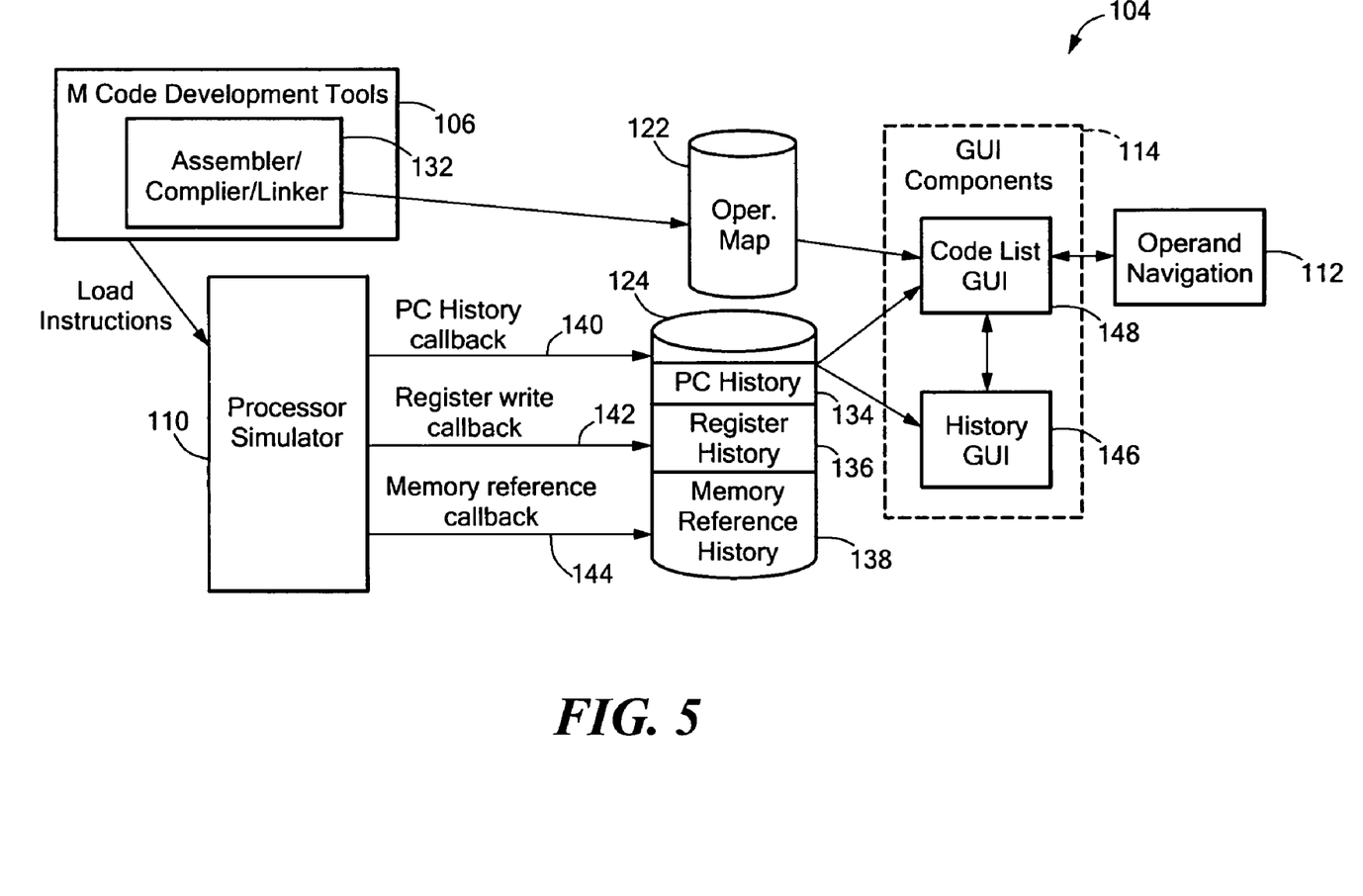
FIG. 5 is a block diagram illustrating the various components of the development/debugger system (from FIG. 4) needed to perform an "Operand Navigation"

FIG. 5 shows a more detailed view of the various components of the application software 104 for the debugger/simulator system of FIG. 4, in particular those components that are needed to perform an instruction operand trace. They include an assembler and/or compiler, as well as linker 132; the processor simulator 110; the Event History 124; the (Instruction) Operation Map 126; GUI components 114; and the Operand Navigation process 112. The Event History 124 includes a Thread (Context)/PC History 134, a Register History 136 and a Memory Reference History 138. These histories, as well as the Operand Map 122, exist for every ME 20 in the processor 12.

The assembler and/or compiler produce the Operand Map 122 and, along with a linker, provide the microcode instructions to the processor simulator 110 for simulation. During simulation, the processor simulator 110 provides event notifications in the form of callbacks to the Event History 124. The callbacks include a PC History callback 140, a register write callback 142 and a memory reference callback 144. In response to the callbacks, that is, for each time event, the processor simulator can be queried for ME state information updates to be added to the Event History. The ME state information includes register and memory values, as well as PC values. Other information may be included as well.

Collectively, the databases of the Event History 124 and the Operand Map 122 provide enough information for the Operand Navigation 112 to follow register source-destination dependencies backward and forward through the ME microcode.

In exemplary embodiments described herein, a debugger breakpoint associated with a line of source code is set in multiple microengines. With this arrangement, where a number of microengines each run an executable image derived from common source code, a breakpoint for the target line of source code can be set for each of the microengines at one time. In one embodiment, when any of the microengines arrives at the breakpoint associated with the target line of source code, program execution terminates and various data and state information can be reviewed by a user.

Figure 6A:
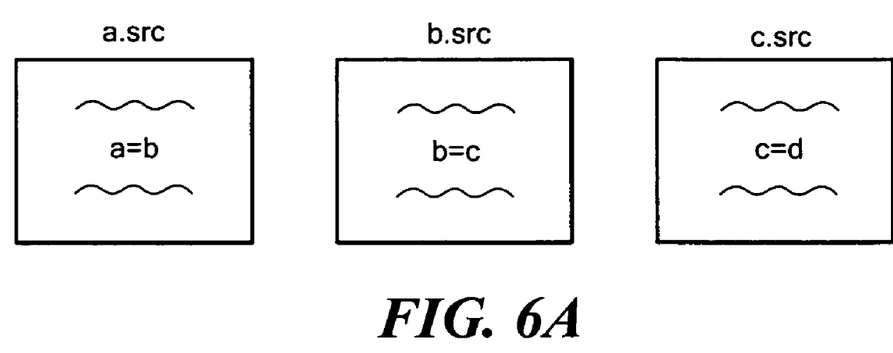
FIG. 6A is a pictorial representation of a series of source code files having various instructions.
Figure 6B:
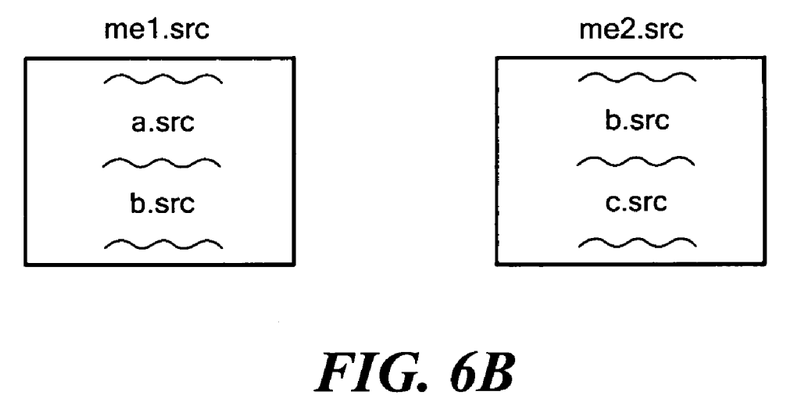
FIG. 6B is a pictorial representation of root source files for microengines containing sources files of FIG. 6A.

FIG. 6A shows a series of source files a.src, b.src, c.src, each containing various program instructions. For example, the first source file a.src can contain an instruction a=b, the second source file b.src can contain an instruction b=c, and the third source file c.src can contain an instruction c=d. From these and other source files, a root source file can be created for a number of microengines as shown in FIG. 6B. For example, a source file me1.src for a first microengine can include, among other source files, the first and second source files a.src. b.src. A source file for a second microengine can include the second and third source files b.src, c.src. In this example, the program code in the second source file b.src is common to both the first and second microengines.

The assembler and/or compiler is then invoked to process the source files me1.src, me2.src for the microengines and produce respective list files, e.g., me1.list, me2.list. A linker receives the list files me1.list, me2.list and generates respective image files, e.g., me1.uof, me2.uof, for each of the microengines. In this example, the first and second microengine image files me1.uof, me2.uof having microcode instructions generated from the second source file b.src. As described more fully below, a user can quickly set a breakpoint in multiple microengines for a microcode instruction associated with a common line of source code.

Figure 7:
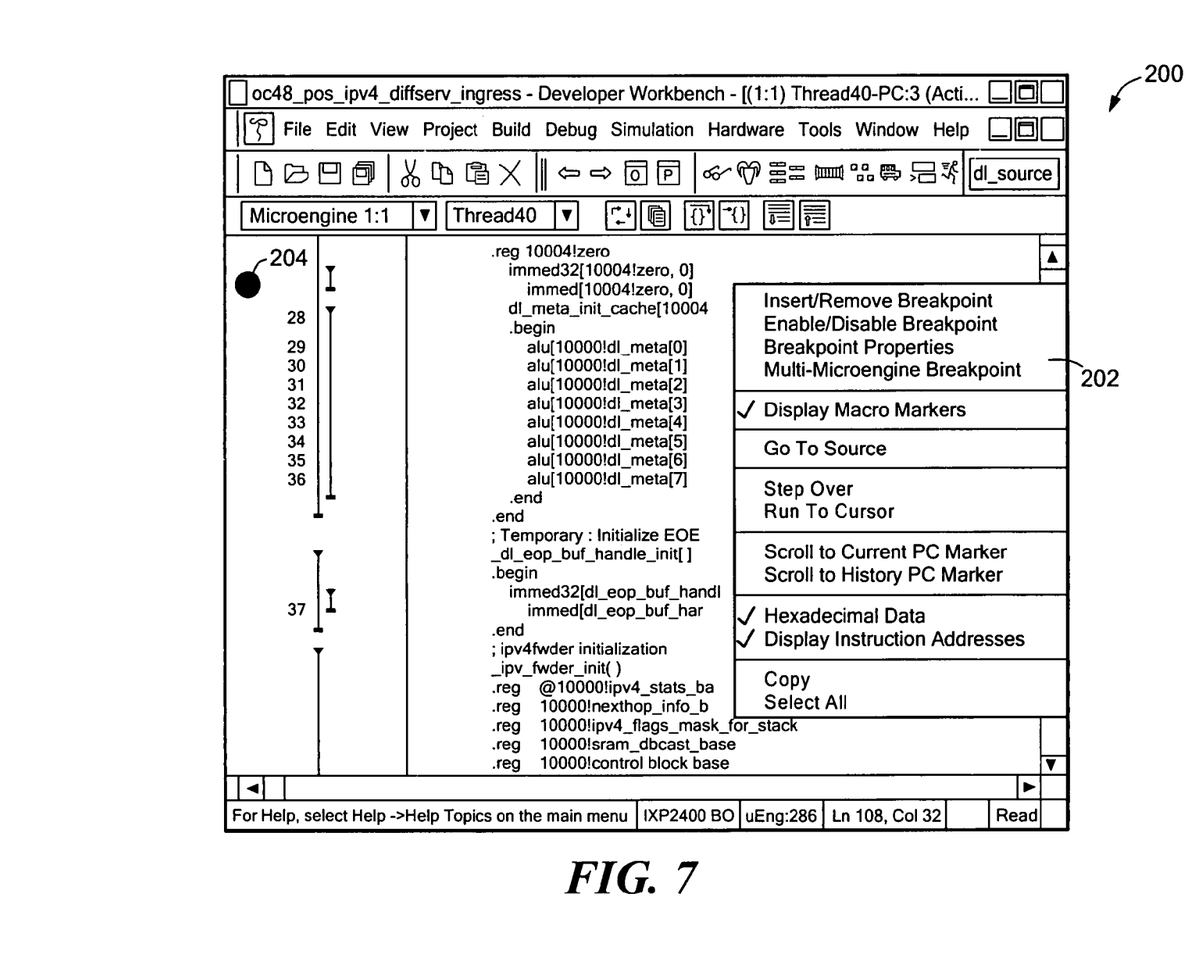
FIG. 7 is a pictorial representation of an exemplary display screen showing a user option to set breakpoints in multiple microengines.

FIG. 7 shows an exemplary display 200 that includes a menu listing to set multi-microengine breakpoints for a common source code instruction. In the illustrated embodiment, the display 200 includes a menu listing for Multi-Microengine Breakpoint 202. After setting a breakpoint at a desired line of code, here shown as line 28 with breakpoint indicator symbol 204 a user can activate the display 200, such as by right clicking on the line of code by means of a conventional computer mouse.

Figure 8:
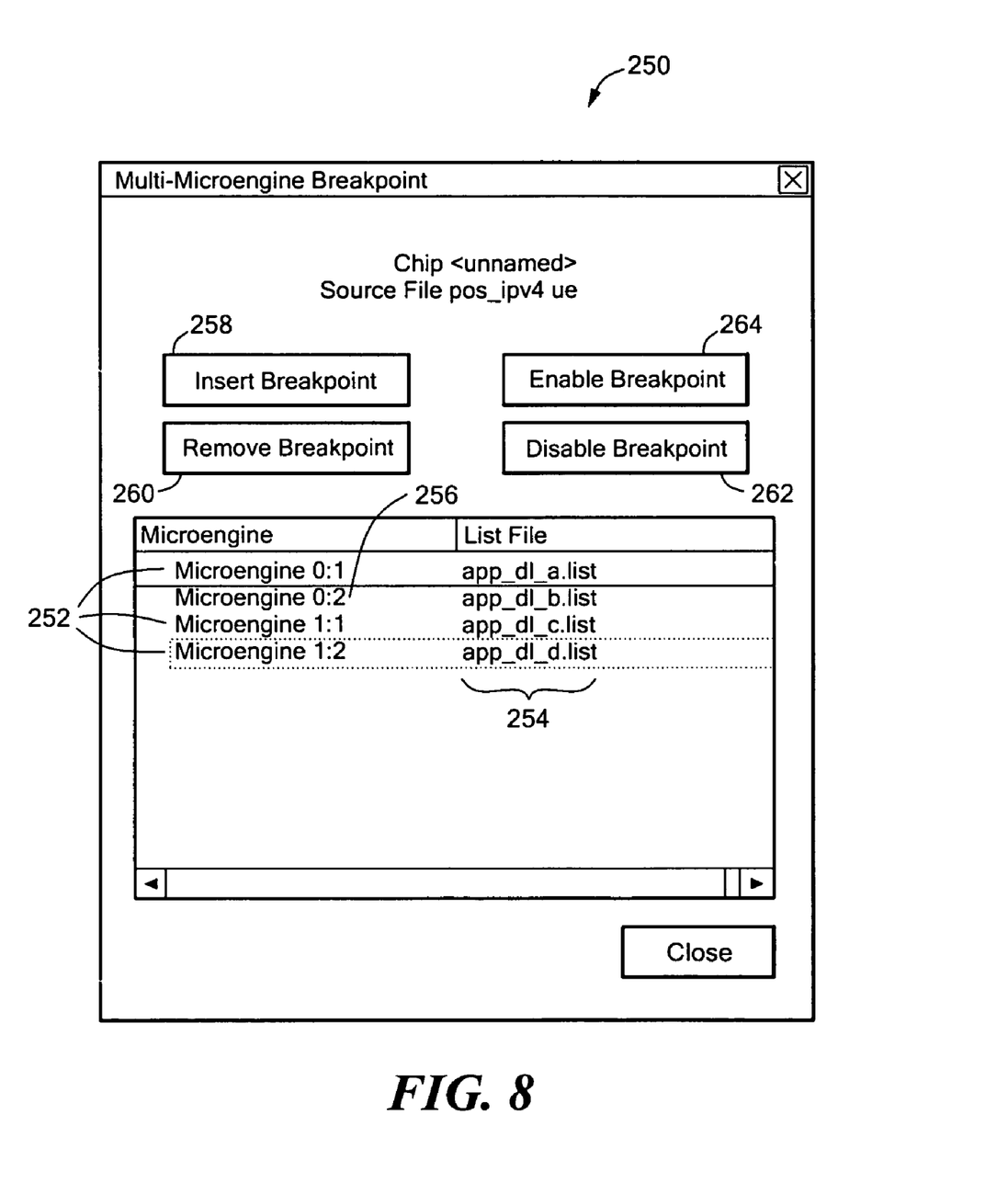
FIG. 8 is a pictorial representation of an exemplary display screen showing a list of microengines having an image file with a microcode instruction generated by a common line of source code.

By selecting the Multi-Microengine Breakpoint 202 option a further screen 250 is displayed as shown in FIG. 8 revealing other microengines 252 having the instruction of interest generated from the same source code. The screen 250 can also display the list files 254 for each of the revealed microengines (e.g., app_dl_a.list, app_dl_b.list, app_dl_c.list, app_dl_d.list). A breakpoint indicator 256 indicates whether the breakpoint is set for each of the microengines.

Exemplary options, which can be provided as a clickable icon, for the user at this point include insert breakpoint 258, remove breakpoint 260, disable breakpoint 262, and enable breakpoint 264. It is understood that desired ones of the displayed microengines are first selected prior to activation of the user option, e.g., insert breakpoint.

In an exemplary embodiment, depending on the state of breakpoints on the selected microengines, one or more of the option icons 258, 260, 262, 264 is enabled. For example, if one or more selected microengines do not have a breakpoint, the insert breakpoint button 258 is enabled. If one or more selected microengines have an enabled breakpoint, the disable breakpoint button 262 and the remove breakpoint button 260 are enabled. And if one or more selected microengines have a disabled breakpoint, the enable breakpoint button 264 and the remove breakpoint button 260 are enabled. When the user clicks on one of the enabled buttons, the debugger performs that action on all the selected microengines.

As described above, the process simulator stores a large amount of data to track operation of the simulated hardware. The stored data also includes program instruction information as the program code executes a simulation. For example, it is well known for debugger to identify and display a source code display associated with a particular line of microcode in a microengine.

Figure 9:
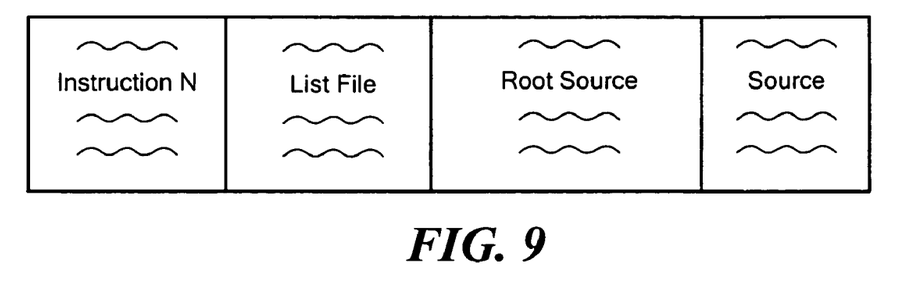
FIG. 9 is a pictorial representation of a relationship between a microcode instruction, a list file, a root source file, and a source file.

FIG. 9 shows exemplary pictorial relationships of a displayed program instruction, such as the breakpoint code instruction shown in FIG. 7. In general, a particular instruction 280 is derived from a list file 282, which was output from an assembler or compiler. The list file 282 is related to a root source file 284, which was provided as the input file to the assembler/compiler. As described above, the root source file may have multiple source code files one of which can have generated the instruction of interest. Once the originating source code file is discovered, list files containing the originating source file can be found in a straightforward manner. And once the list files are identified, the executable images for the microengines can be examined to find occurrences of the source file and the associated line number of the original breakpoint.

Figure 10:
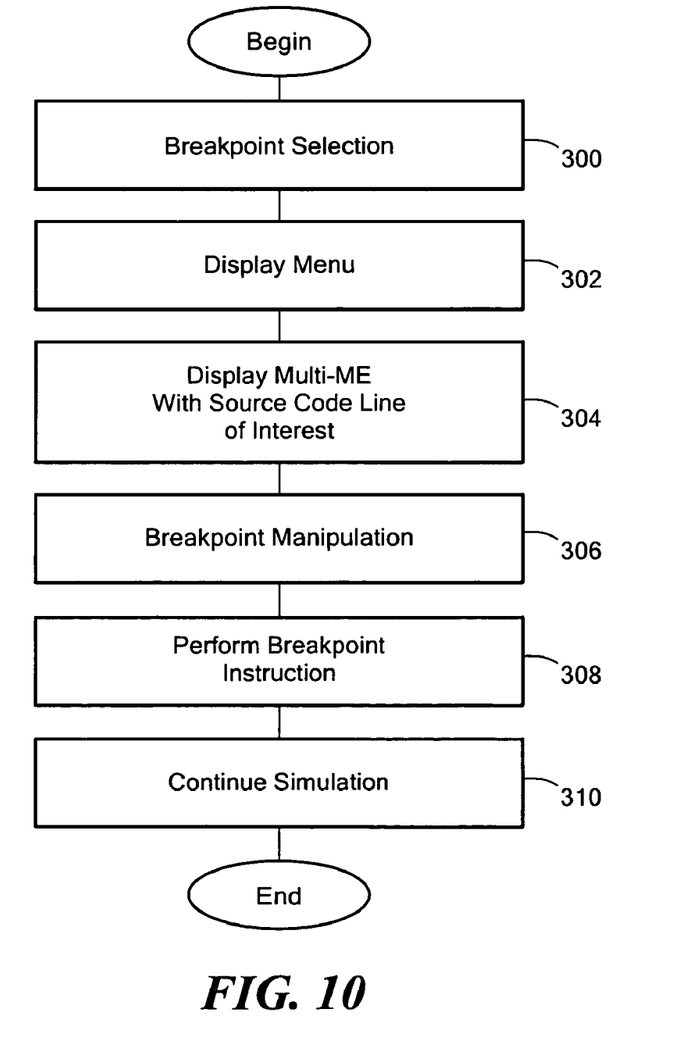
FIG. 10 is a flow diagram showing an exemplary implementation of breakpoint selection in multiple microengines.

FIG. 10 shows an exemplary process to set breakpoints originating from a particular line in a source code file in multiple microengines at one time. In processing block 300, a breakpoint for a particular instruction selected by a user is received. The breakpoint can be selected in a thread window for a first microengine. In response to a user prompt, such as a right click on a line of code, a display screen (see FIG. 7 for example) can be displayed providing various option to a user in processing block 302. In processing block 304, a user selection of multi-microengine breakpoint is received. A breakpoint selection screen is displayed in processing block 306 to receive user instructions. In conjunction with displaying the breakpoint selection screen, a list of microengines having instructions in its image file that are generated by same source code file and line number are displayed.

In processing block 308, a user instruction for breakpoint manipulation is received after the user has selected one or more of the listed microengines of interest. Exemplary options for the user include insert breakpoint, remove breakpoint, enable breakpoint, and disable breakpoint. Based upon the user instruction, in processing block 310 the user instruction is performed and the simulation can continue.

It is understood that a variety of breakpoint types can be manipulated and that a range of breakpoint markers can be used. For example, in one embodiment, a solid red marker indicates the breakpoint is unconditional and is enabled in all threads in the ME. A gray marker indicates the breakpoint is unconditional and is disabled in all threads in the ME. A red marker with a white dot inside indicates the breakpoint is conditional (not set in all contexts) and is enabled in one or more contexts in the ME. A gray marker with a white dot inside indicates the breakpoint is conditional (not set in all contexts) and is disabled in one or more contexts in the ME. A marker with a red border and gray interior indicates a 'special' breakpoint is set meaning that the line generates multiple lines of code, e.g., a macro or a C code source line, and more than one generated line has a breakpoint but they are not all in the same state.

Figure 11:
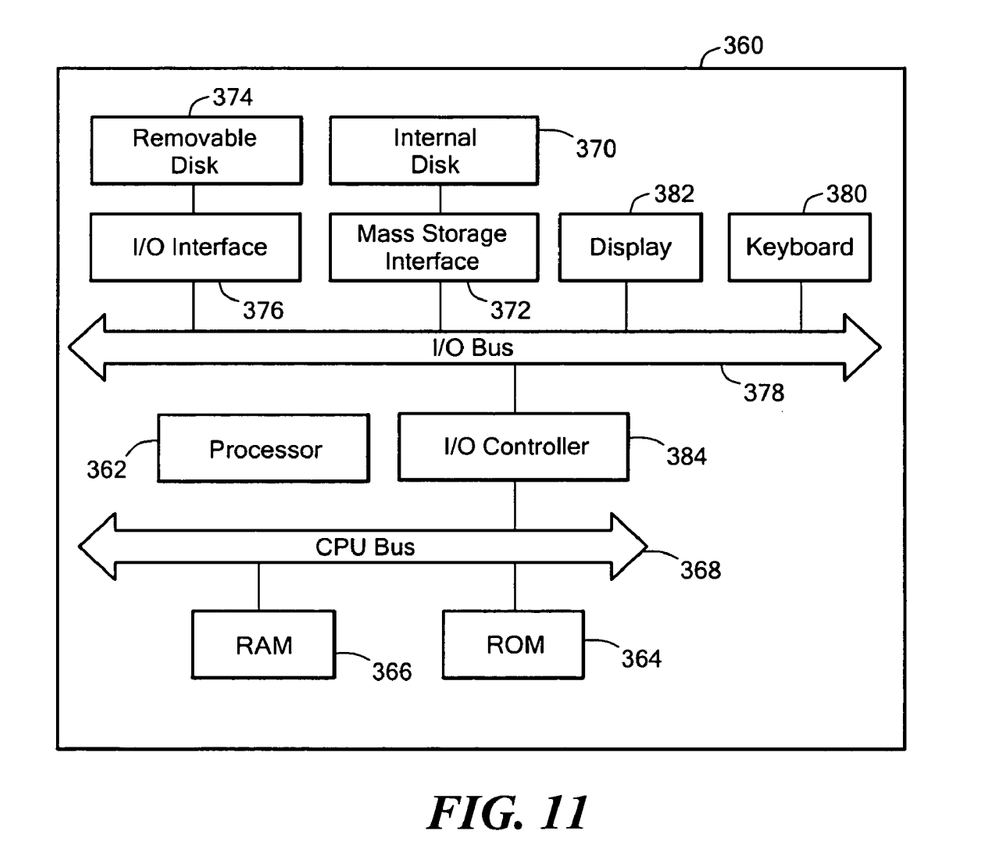
FIG. 11 is a schematic representation of an exemplary computer system suited to run a processor simulator having breakpoint selection in multiple microengines.

Referring to FIG. 11, an exemplary computer system 360 suitable for use as system 102 (as a development/debugger system and, therefore, for supporting multi-microengine breakpoint setting and any other processes is shown. The breakpoint setting tool may be implemented in a computer program product tangibly embodied in a machine-readable storage device for execution by a computer processor 362; and methods may be performed by the computer processor 362 executing a program to perform functions of the tool by operating on input data and generating output.

Suitable processors include, by way of example, both general and special purpose microprocessors. Generally, the processor 362 will receive instructions and data from a read-only memory (ROM) 364 and/or a random access memory (RAM) 366 through a CPU bus 368. A computer can generally also receive programs and data from a storage medium such as an internal disk 370 operating through a mass storage interface 372 or a removable disk 374 operating through an I/O interface 376. The flow of data over an I/O bus 378 to and from devices 370, 274, (as well as input device 280, and output device 282) and the processor 362 and memory 366, 364 is controlled by an I/O controller 384. User input is obtained through the input device 280, which can be a keyboard, mouse, stylus, microphone, trackball, touch-sensitive screen, or other input device. These elements will be found in a conventional desktop computer as well as other computers suitable for executing computer programs implementing the methods described here, which may be used in conjunction with output device 282, which can be any display device (as shown), or other raster output device capable of producing color or gray scale pixels on paper, film, display screen, or other output medium.

Storage devices suitable for tangibly embodying computer program instructions include all forms of non-volatile memory, including by way of example semiconductor memory devices, such as EPROM, EEPROM, and flash memory devices; magnetic disks such as internal hard disks 370 and removable disks 374; magneto-optical disks; and CD-ROM disks. Any of the foregoing may be supplemented by, or incorporated in, specially-designed ASICs (application-specific integrated circuits).

Typically, processes reside on the internal disk 374. These processes are executed by the processor 362 in response to a user request to the computer system's operating system in the lower-level software 105 after being loaded into memory. Any files or records produced by these processes may be retrieved from a mass storage device such as the internal disk 370 or other local memory, such as RAM 266 or ROM 364.

The system 102 illustrates a system configuration in which the application software 104 is installed on a single stand-alone or networked computer system for local user access. In an alternative configuration, e.g., the software or portions of the software may be installed on a file server to which the system 102 is connected by a network, and the user of the system accesses the software over the network.

Other embodiments are within the scope of the following claims.

What is claimed is:

1. A method of debugging, comprising;
receiving a breakpoint selection for a program instruction associated with a first image file for a first processing engine;
identifying a source code file and a source code line in the source code file that generated the program instruction;
identifying further processing engines having an image file containing a program instruction generated by the source code line in the source code file; and
manipulating respective breakpoints for selected ones of the further processing engines based upon user selection, wherein the manipulated breakpoints correspond to program instructions generated by the source code line of the source code file.

2. The method according to claim 1, further including displaying a first screen that includes a mechanism to list the further processing engines.

3. The method according to claim 2, further including displaying a second screen to enable a user to select the further ones of the processing engines.

4. The method according to claim 3, further including displaying the second screen to enable the user to manipulate the breakpoints as one or more of inserting the breakpoint, removing the breakpoint, enabling the breakpoint and disabling the breakpoint for the selected ones of the further processing engines.

5. The method according to claim 1, further including identifying the further processing engines by searching image files for the further processing engines to identify source code files for the image files containing the source code line.

6. The method according to claim 1, further including receiving a selection of breakpoint type.

7. An article, comprising:
a storage medium having stored instructions thereon that when executed by a machine result in the following;
receiving a breakpoint selection for a program instruction associated with a first image file for a first processing engine;
identifying a source code file and a source code line in the source code file that generated the program instruction;
identifying further processing engines having an image file containing a program instruction generated by the source code line in the source code file; and
manipulating respective breakpoints for selected ones of the further processing engines based upon user selection, wherein the respective breakpoints correspond to program instructions generated by the source code line of the source code file.

8. The article according to claim 7, further including stored instructions to enable displaying a first screen that includes a mechanism to enable a user to see the further processing engines.

9. The article according to claim 8, further including stored instructions to enable displaying a second screen to enable a user to select the further ones of the processing engines.

10. The article according to claim 9, further including stored instructions to enable displaying the second screen to enable the user to select one or more of inserting the breakpoint, removing the breakpoint, enabling the breakpoint and disabling the breakpoint for the selected ones of the further processing engines.

11. An article, comprising a storage medium having executable instructions, the executable instructions comprising instructions causing a machine to:
render a first window rendering microcode instructions associated with a first image file for a first processing engine in a processor simulator including a breakpoint for a first one of the microcode instructions generated by a source code line in a source code file;
render a first menu rendering user options including a first option to set breakpoints in multiple processing engines; and
render a second window rendering further processing engines having respective image files containing microcode instructions generated from the source code line and to enable the user to manipulate respective breakpoints for the further processing engines.

12. The article of claim 11, wherein the second window includes icons to manipulate the respective breakpoints by one or more of inserting breakpoints, removing breakpoint, enabling breakpoints and disabling breakpoints.

13. The article of claim 12, wherein the second window includes a display of the respective image files.

14. A debugger tool system, comprising
a processor; and
memory coupled to the processor, wherein the processor and memory combine to execute instructions that result in the following:
receiving a breakpoint selection for a program instruction associated with a first image file for a first processing engine;
identifying a source code file and a source code line in the source code file that generated the program instruction;
identifying further processing engines having an image file containing a program instruction generated by the source code line in the source code file; and
manipulating respective breakpoints for selected ones of the further processing engines based upon user selection, wherein the respective breakpoints correspond to program instructions generated by the source code line of the source code file.

15. The system according to claim 14, wherein manipulating the respective breakpoints includes one or more of inserting breakpoints, removing breakpoint, enabling breakpoints and disabling breakpoints.

16. The system according to claim 14, further including displaying a list of the identified further processing engines.

17. A network forwarding device, comprising:
a switch fabric; and
multiple line cards interconnected by the switch fabric, individual ones of the line cards comprising a network processor including multi-threaded microengines configured to execute microcode,
wherein the microcode includes instructions developed using a debugger tool that identified and enabled breakpoints to be set on multiple ones of the multi-threaded microengines, wherein the breakpoints correspond to a common line of source code in a common source code file.

18. The device according to claim 17, wherein the debugger tool includes a graphical user interface comprising:
a first window to show microcode instructions associated with a first image file for a first processing engine in a processor simulator including a breakpoint indicator for a first one of the microcode instructions generated by a source code line in a source code file;
a first menu to show user options including a first option to set breakpoints in multiple processing engines; and
a second window to display further processing engines having respective image files containing microcode instructions generated from the source code line and to enable the user to manipulate respective breakpoints for the further processing engines.

19. The device according to claim 17, wherein the breakpoints were manipulated by one or more of inserting the breakpoints, removing the breakpoints, enabling the breakpoints and disabling the breakpoints for the selected ones of the further processing engines.

* * * * *

UNITED STATES PATENT AND TRADEMARK OFFICE
CERTIFICATE OF CORRECTION

| | | |
|---|---|---|
| PATENT NO. | : 7,222,264 B2 | Page 1 of 1 |
| APPLICATION NO. | : 10/804843 | |
| DATED | : May 22, 2007 | |
| INVENTOR(S) | : Muratori et al. | |

It is certified that error appears in the above-identified patent and that said Letters Patent is hereby corrected as shown below:

On Sheet 6 of 11, in FIG. 5 (Referral Numeral 132), line 2, delete "Complier" and insert -- Compiler --, therefor.

Signed and Sealed this

Seventh Day of August, 2007

JON W. DUDAS
*Director of the United States Patent and Trademark Office*